Feb. 4, 1936.  S. N. MEAD  2,029,782

MOTOR BRUSH ASSEMBLY

Filed May 25, 1934

INVENTOR
SAMUEL NELSON MEAD
BY
James N. Curtin
ATTORNEY

Patented Feb. 4, 1936

2,029,782

UNITED STATES PATENT OFFICE 2,029,782

MOTOR BRUSH ASSEMBLY

Samuel Nelson Mead, Amesbury, Mass.

Application May 25, 1934, Serial No. 727,387

5 Claims. (Cl. 171—323)

This invention relates to a motor brush assembly and has for its object to provide an assembly suitable for use in connection with moisture proof or dust proof motors.

Another object is to provide a brush which will maintain contact with a slip ring regardless of any shock which the motor brush may be subjected to.

Still another object is to provide an inexpensive assembly of brushes in a single unit which can be removed from the motor with a minimum of effort, and which when in place acts as a closure that serves to seal the motor making it dust and moisture proof.

The present invention is suitable for use in connection with small synchronous motors used to operate indicating and control devices.

The armatures of such motors must be capable of rotating with a very slight amount of friction in order to operate accurately. On board ship, especially battle ships, where accurate operation is essential, it has been found that vibration of engines and shock of gunfire have a tendency to jar the brushes of such motors out of contact with the slip rings thus causing erratic and unreliable operation of the indicating system.

If pressure of the brushes on the slip rings be increased sufficiently to overcome this difficulty, the added friction will greatly reduce the efficiency of the motor. Accordingly a further object of this invention is to provide a brush which will maintain contact with very slight pressure on the slip rings.

Referring to the drawing.

Figure 1:
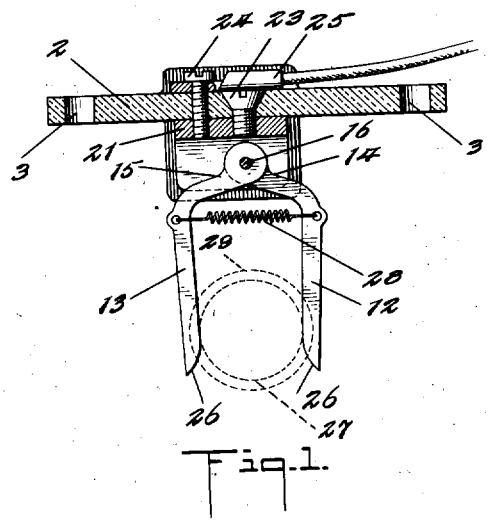
Figure 1 is a section taken through 1—1 of Fig. 2.
Figure 2:
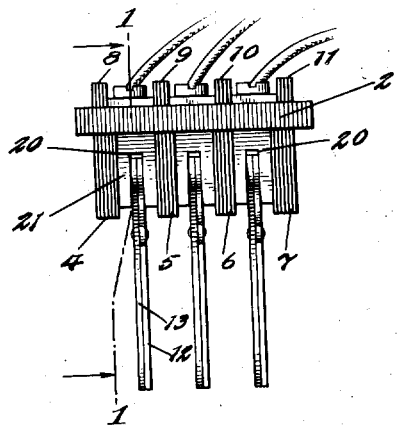
Figure 2 is a top view of the assembly.

Both figures are shown considerably enlarged for the sake of clearness.

The invention consists of a cover or plate 2 which serves as a base for the brush assembly. This base is adapted to fit over a suitably situated opening in the motor case (not shown) to which it may be secured by any convenient means such as by screws. Reference characters 3 indicate holes for such screws. If desired a gasket may be placed between the plate 2 and the motor casing.

The drawing shows a brush assembly suitable for use in connection with a three phase indicating motor. Three sets of brushes are provided.

Plate 2 is made, preferably, of some molded insulating material such as bakelite. In the present embodiment, the plate is formed so as to have near its central portion four raised sections or fins on each side, 4, 5, 6 and 7 on the inner side of the plate forming three channels in which the respective brushes are mounted; the raised sections serving to insulate the brushes from each other. On the outer side of the plate, the lugs connected to the respective brushes are insulated by corresponding raised sections 8, 9, 10, and 11.

Each brush consists of two blades, 12 and 13, both being substantially L-shaped with their shorter ends, 14 and 15 freely movable on a common pivot 16, in a slot 20 in a piece of brass, or other suitable metal 21. The latter is of the same general shape as the fins 4, 5, 6, and 7, but smaller in size, and of such thickness that it fits snugly between any of the adjacent pairs of fins. Each member 21 is secured in its particular slot by a screw 23. Obviously, with the construction just described one screw is sufficient to hold each brush in place because the fins separating the brushes prevent them from turning and at the same time serve to insulate the brushes from each other.

The brushes are connected to external circuits by means of screws 24 which pass through holes in base 2 and are threaded into members 21. Lugs 25 are secured by screws 24, and are insulated from each other by the fins 8, 9, 10, and 11.

Sections 26 of each pair of brushes 12 and 13 are rounded off at the end in order to make it easier to slip the brushes over the slip rings 27 when the assembly is being set in position. Sections 26 make contact with a slip ring at substantially diametrically opposite points, where they are held in contact by spring 28 which connects the two brush blades. The larger dotted ring 29 in Fig. 1 represents a raised insulating ring between the motor slip rings.

The brush just described operates as follows:

Spring 28 has just sufficient tension to hold both brushes 12 and 13 in contact with slip ring 27. Due to the fact that only the relatively thin edges of the blades ride on the ring, friction is reduced to a minimum. If the motor be subjected to a shock of such a nature as to tend to jar one brush out of contact, the other brush will be more firmly held against the slip ring due to an increased tension on the brush spring.

Due to the novel construction disclosed the parts of the brushes in engagement with the slip rings have a certain amount of side play which tends to prevent the relatively narrow edges of the brushes from wearing grooves in the slip ring. Pig tail connections may be provided between the brush blades and the slotted member 21 according to well known practice.

I claim:

1. A motor brush assembly comprising in combination a base, a plurality of independent brushes, each brush consisting of a pair of flat metal blades extending from said base to engage edgewise the opposite sides of a slip ring of a motor, and a retractile spring connecting the respective blades of each brush.

2. A motor brush assembly comprising a base, a plurality of independent brushes, each brush consisting of a pair of blades of flat metal, means for pivoting one end of each blade at the base so that the blades extend therefrom to engage edgewise the opposite sides of a slip ring of a motor, and a retractile spring connecting the respective blades of each brush to hold them in contact with said slip ring.

3. A motor brush assembly comprising a base, a plurality of independent brushes, each brush consisting of a pair of blades of flat metal, a plurality of channels formed in said base for separating the respective brushes, means for pivotally mounting one end of each blade at the base so that the blades extend therefrom to engage edgewise opposite sides of a slip ring of a motor, and a spring located between said mounting and slip ring tending to draw the blades together.

4. A motor brush assembly comprising a base, a plurality of independent brushes, each brush consisting of a pair of blades of flat metal, a single pivot for mounting each pair of blades at the base so that the blades extend from the base to engage edgewise opposite ends of a diameter of a slip ring of a motor, and a retractile spring connecting both blades of a brush located between said pivot and the slip ring.

5. A motor brush comprising a pair of flat blades, a common pivot for supporting said blades so that they engage edgewise opposite sides of a slip ring.

SAMUEL NELSON MEAD.